United States Patent [19]

Lindeborg et al.

[11] Patent Number: 5,646,939
[45] Date of Patent: Jul. 8, 1997

[54] METHOD AND APPARATUS FOR ADDRESS TO PORT MAPPING IN A TOKEN RING NETWORK

[75] Inventors: Carl Lindeborg, Shrewsbury; Edward Carroll, Wrentham; James Moran, Methuen; David Bartolini, Charlton, all of Mass.; John Griesing, Santa Clara, Calif.; Liz Lindell, Sutton, Mass.; Anthony Dean Walker, Rougemont; Bradley S. Trubey, Cary, both of N.C.

[73] Assignees: International Business Machines Coporation, Armonk, N.Y.; 3Com Corporation, Santa Clara, Calif.

[21] Appl. No.: 512,719

[22] Filed: Aug. 8, 1995

[51] Int. Cl.$^6$ ............ H04L 12/26; H04L 12/433
[52] U.S. Cl. .............. 370/258; 370/434; 370/452; 370/909; 340/825.05; 340/825.07
[58] Field of Search ................ 370/13, 14, 16, 370/16.1, 56, 85.4, 85.5, 85.15, 92, 85.12, 85.13, 85.14; 340/825.05, 825.06, 825.07, 825.52; 395/181, 182.01, 182.02

[56] References Cited

U.S. PATENT DOCUMENTS

| 5,105,188 | 4/1992 | Jung et al. ............ 340/825.05 |
| 5,132,962 | 7/1992 | Hobgood et al. ............ 370/16.1 |
| 5,285,448 | 2/1994 | Nakayama et al. ............ 370/85.5 |
| 5,301,303 | 4/1994 | Abraham et al. ............ 395/500 |
| 5,383,191 | 1/1995 | Hobgood et al. ............ 370/16.1 |

*Primary Examiner*—Alpus H. Hsu
*Attorney, Agent, or Firm*—McGlew and Tuttle

[57] ABSTRACT

A token ring network performs address to port mapping by taking advantage of the abilities of the port switched modules and the neighbor notification process, in order to perform address to port mapping on each individual module. Ring monitors are switched from an upstream side of a port to a downstream side of a port when the neighbor notification process enters the port domain. The processor on the module records all the addresses received on the downstream side of the port, when the neighbor notification process is in the domain of that port. If it appears that the neighbor notification process is in the domain of two adjacent ports, the present invention only records addresses from the most downstream of the two adjacent ports, since such a situation is an indication that the upstream ports do not conform to MAC protocol. If a non-protocol station is connected to the last port in a module, the module will collect addresses from that port until the neighbor notification process enters the most upstream port of the module. At that point, addresses are no longer recorded in the most downstream port, and each set of addresses for each port are checked to determine if the last entry in each port has the ARI bits set to one and the source address is similar to the address of the most upstream neighbor of the module. If the addresses are the same, all addresses recorded in that port are ignored, since that port contains a non-protocol station.

19 Claims, 18 Drawing Sheets

→ = Token Ring Data Path
S = Token Ring Station
RM = Ring Monitor

|  | Data Table 1 | Data Table 2 | Port Map |
|---|---|---|---|
| Lobe Port 2A | 00-11-22-33-44-55 | 01-00-00-00-00-01<br>ARI = 0 | 01-00-00-00-00-01 |
| Lobe Port 2B | 01-00-00-00-00-01 | 02-00-00-00-00-02<br>ARI = 0 | 02-00-00-00-00-02 |
| Lobe Port 2C | 02-00-00-00-00-02 | 03-00-00-00-00-03<br>ARI = 0 | 03-00-00-00-00-03 |

*FIGURE 4.* Normal Address to Port Map

|  | Data Table 1 | Data Table 2 | Port Map |
|---|---|---|---|
| Lobe Port 2A | 00-11-22-33-44-55 | 01-00-00-00-00-01<br>ARI = 1<br>01-00-00-00-00-02<br>ARI = 1<br>01-00-00-00-00-03<br>ARI = 0 | 01-00-00-00-00-01<br>01-00-00-00-00-02<br>01-00-00-00-00-03 |
| Lobe Port 2B | 01-00-00-00-00-03 | 02-00-00-00-00-02<br>ARI = 0 | 02-00-00-00-00-02 |
| Lobe Port 2C | 02-00-00-00-00-02 | 03-00-00-00-00-03<br>ARI = 0 | 03-00-00-00-00-03 |

*FIGURE 9.* Address to Port Map with Fanout Device on Port 1

|  | Data Table 1 | Data Table 2 | Port Map |
|---|---|---|---|
| Lobe Port 2A | 00-11-22-33-44-55 | 01-00-00-00-00-01<br>ARI = 0 | 01-00-00-00-00-01 |
| Lobe Port 2B | 01-00-00-00-00-01 |  |  |
| Lobe Port 2C | 01-00-00-00-00-01 | 03-00-00-00-00-03<br>ARI = 0 | 03-00-00-00-00-03 |

*FIGURE 14.* Address to Port Map with MAC-less Station on Port 2

|  | Data Table 1 | Data Table 2 | Port Map |
|---|---|---|---|
| Lobe Port 2A | 00-11-22-33-44-55 | 01-00-00-00-00-01<br>ARI = 0 | 01-00-00-00-00-01 |
| Lobe Port 2B | 01-00-00-00-00-01 | 02-00-00-00-00-02<br>ARI = 0 | 02-00-00-00-00-02 |
| Lobe Port 2C | 02-00-00-00-00-02 | xx-xx-xx-xx-xx-xx<br>xx-xx-xx-xx-xx-xx<br>00-11-22-33-44-55<br>ARI = 1 |  |

*FIGURE 17.* Address to Port Map with MAC-less Station on the Last Port

METHOD AND APPARATUS FOR ADDRESS TO PORT MAPPING IN A TOKEN RING NETWORK

FIELD OF THE INVENTION

The present invention relates in general to a token ring communication network, and in particular to an IEEE 802.5 communication protocol standard with address to port mapping on a distributed basis on each media module in a concentrator.

BACKGROUND OF THE INVENTION

A token ring network is a system for connecting a plurality of stations in order to have each station able to communicate with all other stations. Each station has an input line and an output line. The concentrator with the media modules connect all of the lines so that signals on the output line of one station are delivered to the input line of the next downstream station. All these stations are thus connected in a line, with the output line of the last downstream station being connected to the input line of the first station. The stations are thus connected together in a ring. In order to organize the communication on the ring, a token is passed along the ring to indicate when a station can and cannot transmit onto the ring. When a station desires to transmit, it first determines if the ring is available. If the ring is available, the station transmits a frame onto the ring. The frame contains, among other things, a destination address of the station which is to receive the transmission, and a source address which is the address of the station generating the transmission. The frame then gets passed to the next downstream station. The downstream station looks at the destination address of the frame and if the frame is not destined for that station, the station then passes the frame onto the next station. When the frame reaches the destination station, the destination station reads in the data of the frame, and then continues to pass the frame along the ring. When the frame reaches the original source station, the source station removes the frame from the ring and then makes the ring available again for transmission.

One way to implement a token ring network is with a concentrator that contains one or more media modules. The media modules contain ports, and each station connects to a port in the concentrator. The media module and the concentrator connect all the ports to form the individual stations into a token ring. The concentrator provides a connection between the media modules and also performs management of the network or the several individual networks. In order to perform management, it is helpful for the concentrator to know which ports are being used and who is using them.

A concentrator also can provide a security function, in only allowing particular stations access to a particular ring network. A concentrator can also perform a statistical analysis to determine if a particular station is overloading or damaging the network. The management function of the concentrator can then identify this station in order to send a message to the station to correct a problem, or gain additional information from the station. All of these functions require knowledge of the stations connected to the ports.

The market for concentrators has been driven by the necessity to manage a large numbers of workstations in an efficient manner. One of the main functions of a networking hub is to provide network managers a map of workstations connected to each port on the concentrator. This function is commonly referred to as "Address to Port Mapping". The map created by this function associates the MAC (Media Access Control) layer address of the workstation to the physical port on the concentrator. In the production of each station, the individual station can be registered with a standards organization and a unique MAC address can be assigned to that station. That station can then use that MAC address as its own address whenever it is connected to a network and other stations can send data to the station by using its MAC address. Often the MAC layer address is then associated with physical locations and/or user names by network management tools.

The Institute of Electronic and Electrical Engineers (IEEE) has formed a well-known standard called the IEEE 802.5 communication protocol standard which is incorporated herein by reference. This IEEE 802.5 communication standard provides a general overview and background of the well-known token ring communication topology. In the IEEE 802.5 Token Ring environment, concentrators have traditionally associated MAC address with ports by monitoring Port Insertion and Neighbor Notification processes. Token Ring Stations assert or negate a DC (Phantom) current to indicate their desire to insert into or de-insert from the ring. The concentrator monitors port insertion and de-insertion to determine which ports are active.

The concentrator would typically use a centralized MAC device for each token ring, to parse the Neighbor Notification frames (Active Monitor Present and Standby Monitor Present MAC frames). The centralized MAC would filter all Neighbor Notification frames into a buffer. Software routines would then be used to match station insertions and de-insertions with newly present or newly absent participants in the Neighbor Notification process.

The centralized MAC scheme works well for rings where there is a one to one correspondence between ports and MAC stations that participate in Neighbor Notification. There are common network configurations that do not provide this one to one correspondence. One example of this is when a fanout device is in use. Fanout devices allow more than one token ring station to be inserted on a single concentrator module port. Fanout devices create a problem for centralized address to port mapping schemes because there is no longer a correspondence between station insertion/de-insertion and Phantom drive to a port. Often, centralized mapping schemes can not distinguish as to whether a station is attached to a specific port or the adjacent port on that ring.

Another situation where there is not a one to one correspondence between port insertions and a MAC address is when a "MAC-less" token ring station is inserted on a concentrator module port. Several Token Ring analysis tools fall into the category of "MAC-less" station. "MAC-less" stations monitor and repeat, but do not generate, token ring frames. As such, these devices do not participate in the Neighbor Notification process, and cannot provide the information required to assemble an address to port map. Thus, centralized mapping schemes can not distinguish the attachment of adjacent stations in the presence of MAC-less stations.

U.S. Pat. No. 5,319,644 describes a method and apparatus for identifying port/station relationships in a network. In this reference, three lists are formed. A sequential list of all the active ports is formed, a sequential list of all the active stations is formed, and then a sequential list of all the end stations in a port are formed. Using these three lists, it can be determined which stations are connected to a particular port. This method requires a centralized entity to form all of the lists. Having a single centralized entity perform all of the work required to associate an address with a port, requires that the centralized entity be made capable of handling the maximum number of modules and ports connectable to a concentrator. Concentrators are very adaptable with regard to the number of ports which they can support, and therefore a centralized entity may have to be made very capable. Much capacity would be wasted if the concentrator was only partially used. Also, if a large number of active ports are being supported by the concentrator, the centralized entity must perform much work, which could possibly detract from other management functions that the concentrator performs. However, U.S. Pat. No. 5,319,644 is very informative with regard to the state of the art and is incorporated by reference.

U.S. Pat. No. 5,361,250 is also very informative with regard to the state of the art and is incorporated by reference.

SUMMARY AND OBJECTS OF THE PRESENT INVENTION

It is an object of the present invention to provide reliable and economical connection information with regard to the stations associated with each port. The method and apparatus of the present invention includes an algorithm implemented on each media module in the concentrator. These algorithms are implemented in hardware and software.

This method of address to port mapping in an IEEE802.5/ Token Ring concentrator provides effective means of mapping single and multiple stations (fanout) to a single lobe port. It also provides the means of handling MAC-less stations while maintaining port map integrity.

Because port mapping is a distributed process, it provides an economic way of mapping multiple token rings, both common/backplane rings and isolated rings. Being that this method is a distributed process, end users may reconfigure existing gear without the concern of needing additional equipment to provide an address to port map.

Because Address to Port Mapping is implemented on every module, it is not dependent on central management. Thus any number of rings may be supported without incurring incremental cost. Further, unlike Centralized Address to Port Mapping schemes, this distributed Address to Port Mapping scheme may be implemented on any number of rings that are formed on a module, but remain isolated from a common/backplane ring.

Address to Port Mapping is performed in conjunction with the following tasks; Detecting the Neighbor Notification process as it enters port and module domains, Tracking the Neighbor Notification process within the module's domain to position Ring Monitors, gathering MAC addresses for each port domain, and detecting the Neighbor Notification process as it leaves port and module domains.

Neighbor Notification Process

The Neighbor Notification process is fundamental to token ring/IEEE 802.5 as it provides the means for management, error isolation and recovery. Management functions monitor the Neighbor Notification process to form ring maps and port maps. Network Diagnostic tools use the Nearest Active Upstream Neighbor to isolate errors. Beacon Recovery uses the Nearest Active Upstream Neighbor to identify the fault domain.

The Neighbor Notification process runs continuously. The Active Monitor initiates a Neighbor Notification cycle every 7 seconds. There are two types of Neighbor Notification frames; Active Monitor Present (AMP) and Standby Monitor Present (SMP). The Active Monitor initiates each Neighbor Notification cycle by sending an Active Monitor Present frame. The AMP frame is sent with the Source Address set to its own MAC address, and the Destination Address set to the Broadcast Address. If the Active Monitor knows its upstream neighbor's MAC Address, it will be sent in the frame in the Nearest Active Upstream Neighbor subvector. As with all token ring frames, AMP is sent with Address Recognized Indicator bits (ARI) set to zero. Each Neighbor Notification cycle terminates when the Active Monitor receives a Neighbor Notification frame with the ARI bits set to zero. If there are no other active stations on the ring, the Active Monitor will receive its own frame with the ARI bits set to zero. If there are other active stations on the ring the Active Monitor will recognize the end of the current Neighbor Notification cycle when it receives a SMP frame from its immediate upstream neighbor with ARI bits set to zero.

Active stations shall be defined for the purpose of this application as stations that are participating in MAC protocol. Also for the purpose of this application, MAC-less stations shall be defined as stations that do not participate in MAC protocol. The most common example of a MAC-less station is a network analyzer.

When an active station on the ring immediately downstream of the Active Monitor receives the AMP frame, it sets the ARI bits to one and starts a timer (10-20 milliseconds). When an active station receives any Neighbor Notification frame with the ARI bits equal to zero, it stores the Source Address of that frame as its Nearest Active Upstream Neighbor. When the station's timer expires, the station sends a Standby Monitor Present (SMP) frame with the Source Address set to its own MAC address and the Destination Address set to the Broadcast Address. In this case the Nearest Active Upstream Neighbor is the MAC address of the Active Monitor. As with all token ring frames, the SMP frame is sent with ARI bits set to zero.

Other downstream stations repeat the process of sensing a Neighbor Notification frame with ARI bits equal to zero, setting the ARI bits to one, saving the Source Address of that frame as its Stored Upstream Neighbor, setting a 10-20 ms timer and propagating the Neighbor Notification process.

The present invention involves the use of Port Switched media modules which allow any number of lobe and/or trunk ports to be independently assigned to any physical token ring. A trunk or secondary ring is commonly used among token ring modules in a concentrator, however the feature of the trunk or secondary ring is not essential to the present invention. Each lobe port and trunk port on a Port Switched module has a Ring Monitor. Each Ring Monitor may be configured to receive Neighbor Notification and other MAC frames. The source address (SA), destination address (DA), Nearest Active Upstream Neighbor (NAUN), and address recognized indicator (ARI) bits of each supported frame type are available to a module processor on the media module through the ring monitor. Each Ring Monitor may be instructed to monitor the upstream side (output of the port and upstream of the attached station) or the downstream side (input of the port and downstream of the attached station) of the assigned port, that is the data stream that is transmitted to or received from an inserted Token Ring station. An inserted token ring station is defined to be a token ring station that has driven phantom current on a module port that has been enabled and assigned to a specific ring by concentrator management.

Neighbor Notification frames are detected by the port Ring Monitors. A plurality of independent token rings may be configured on any Port Switched module. The Neighbor Notification process is tracked independently for each ring. When a Ring Monitor of an active port receives a Neighbor Notification frame, it is reported to the module processor. The module processor correlates the receiving port Ring Monitor to a specific token ring.

When a Neighbor Notification frame with the ARI bits set to zero is received at the most upstream Ring Monitor of a group or module which is monitoring the lobe port's upstream side (the data stream transmitted from the module to the attached station), the Neighbor Notification process is said to be in the module's domain.

When a Neighbor Notification frame with the ARI bits set to zero is received at the most downstream Ring Monitor of a group or module which is monitoring the lobe port's downstream side (the data stream received by the module from the attached station), the Neighbor Notification process is said to be leaving module's domain.

When a Neighbor Notification frame with the ARI bits set to zero is received at any lobe port's downstream side, the Neighbor Notification process is said to be leaving port's domain.

The module processor on each media module will detect the Neighbor Notification frames with the port Ring Monitors. After the Neighbor Notification process has been detected to be within a port's domain, the module processor gathers information for first and second Mapping Data Structures or tables. The first Mapping Data Structure is a raw list of the Nearest Upstream Neighbor (MAC address) for each lobe port. The second Mapping Data Structure is a raw list of the Stations (MAC addresses) attached to each lobe port. This is the raw data used to form the port map. The Address to Port Mapping algorithm examines the entries in each data structure to correct for mapping exceptions.

The initial position of each Ring Monitor is to monitor an upstream side of each active lobe port/station.

When a Ring Monitor is positioned at the upstream side of a lobe port, the reception of a Neighbor Notification frame with the ARI bits set to zero will cause the module processor to re-position that Ring Monitor to the downstream side of the lobe port. The Neighbor Notification process is said to be in the port's domain.

When a Ring Monitor is positioned at the downstream side of a lobe port, the reception of Neighbor Notification frame with the ARI bit set to zero will cause the module processor to re-position that Ring Monitor to the upstream side of the lobe port. The Neighbor Notification process is said to be leaving the port's domain.

When the same Neighbor Notification Frame, indicated by a same Source Address and with the ARI bits set to zero, is received by two or more adjacent Ring Monitors that are positioned at the upstream side of lobe ports, only the most downstream port will have it's Ring Monitor re-positioned to the downstream side of the port. When this event takes place it is an indication that the station or stations attached to the upstream ports are not participating in token ring MAC protocol (MAC-less station).

When the most upstream port Ring Monitor is positioned at the upstream side of a port, and receives a Neighbor Notification Frame with the ARI bits set to zero, any downstream ports that were positioned to the downstream side of a port are repositioned to upstream side of that port and terminate the process of gathering Source Addresses for those downstream ports for that Neighbor Notification cycle.

When a Ring Monitor is positioned at the upstream side of port, the module processor will save the Source Address of the Neighbor Notification frame that is received with the ARI bits set to zero, in a corresponding entry of Mapping Data Table 1. This Source Address is the Nearest Active Upstream Neighbor of that port.

When a Ring Monitor is positioned at the downstream side of a port, the module processor stores in a corresponding entry of Mapping Data Table 2, all the Source Addresses and corresponding ARI bits of each Neighbor Notification frame up to and including the Neighbor Notification frame that is received with the ARI bits set to zero.

The module processor forms the address to port map in a two step process. Since Mapping Data Table 2 contains "raw" address mapping data, an additional step must be taken to accommodate MAC-less stations. When there are active stations on the module downstream of a MAC-less station, the positioning algorithm never places the Ring Monitor for the lobe port of the MAC-less station in the downstream position. Therefore, no Source Addresses are associated with the port of a MAC-less station in Mapping Data Table 2. In the case where one or more MAC-less stations reside on the most downstream ports, Source Addresses and the ARI bits will be saved in Mapping Data Table 2 and associated with these ports until a Neighbor Notification Frame, with ARI bits set to zero, is received at the most upstream port. In order that Station Addresses are not incorrectly associated with the downstream ports, if the last entry for each lobe port in Mapping Data Table 2 has the ARI bits set to one, the source address is compared with the Source Address (Nearest Active Upstream Neighbor) of the most upstream port on the module/ring segment in Mapping Data Table 1. If there is a match, all Source Addresses for the port in Mapping Data Table 2 are ignored. If the last entry for each lobe port in Mapping Data Table 2 has the ARI bits set to zero, all entries for that port are validated.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4, is a table of the addresses recorded by the present invention in the first example;

FIG. 9, is a table of the addresses recorded during the second example;

FIG. 14, is a table of the addresses recorded during the third example;

FIG. 17, is a table of the addresses received during the fourth example;

DETAILED DESCRIPTION OF THE PREFERRED EMBODIMENT

Figure 1:
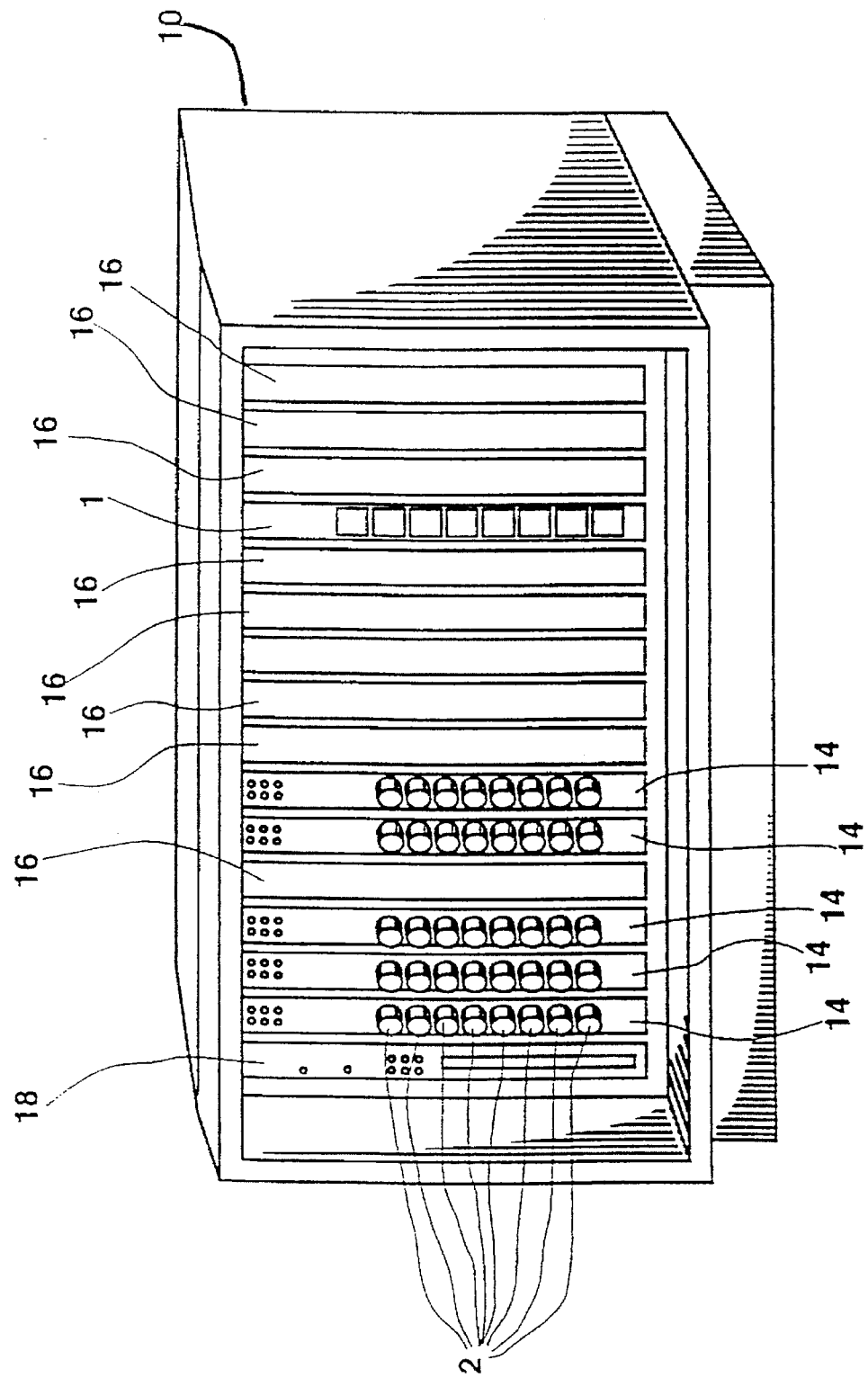
FIG. 1, is a view of a concentrator.
Figure 2:
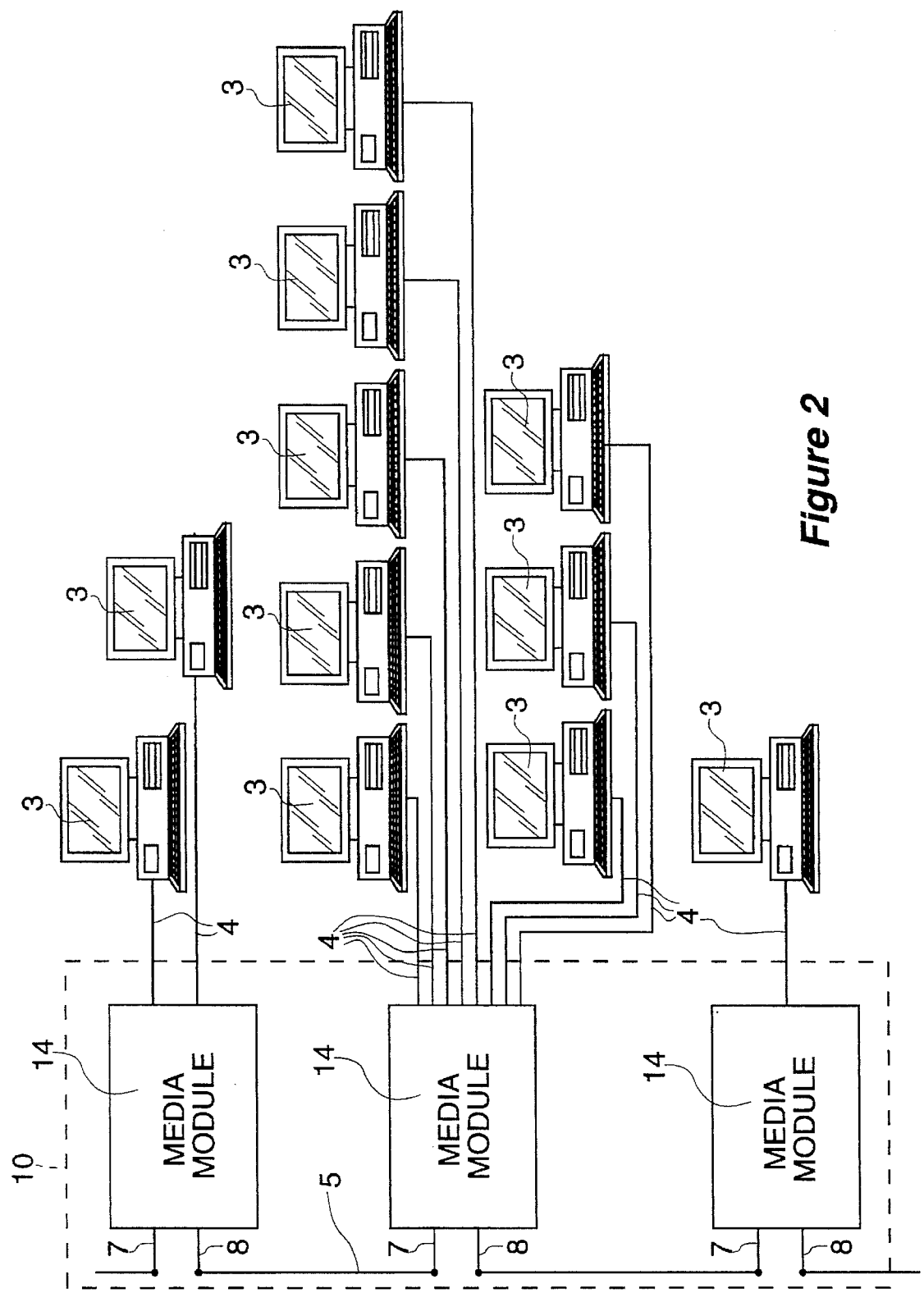
FIG. 2, is a schematic view of a plurality of stations connected to a plurality of media modules inside a concentrator.

Referring to the drawings, especially FIG. 1, a concentrator 10 contains a plurality of media modules 14 and a plurality of empty slots 16 which can be filled with modules. Each of the media modules 14 have a plurality of ports 2. As shown in FIG. 2, a plurality of stations can be connected over lines or lobes 4 to the ports 2 of media modules 14. The concentrator 10 has a backplane ring 5, of which a portion is shown in FIG. 2. The backplane ring 5 connects the modules 14 to form a token ring network. The module 14 is a port-switched module and it is possible for each station to independently connect to any ring on the concentrator or form a ring between any of the stations on the port-switched module.

It is also possible to connect a plurality of concentrators through bridge or router modules 1. In this way, the modules on several different concentrators can be connected to form a single ring or a plurality of rings. In the present invention, the address to port mapping is performed independently on each module and therefore is independent of the number of modules and/or the number of concentrators connected. Each media module 14 contains a module processor for performing the address to port mapping.

Figure 3:
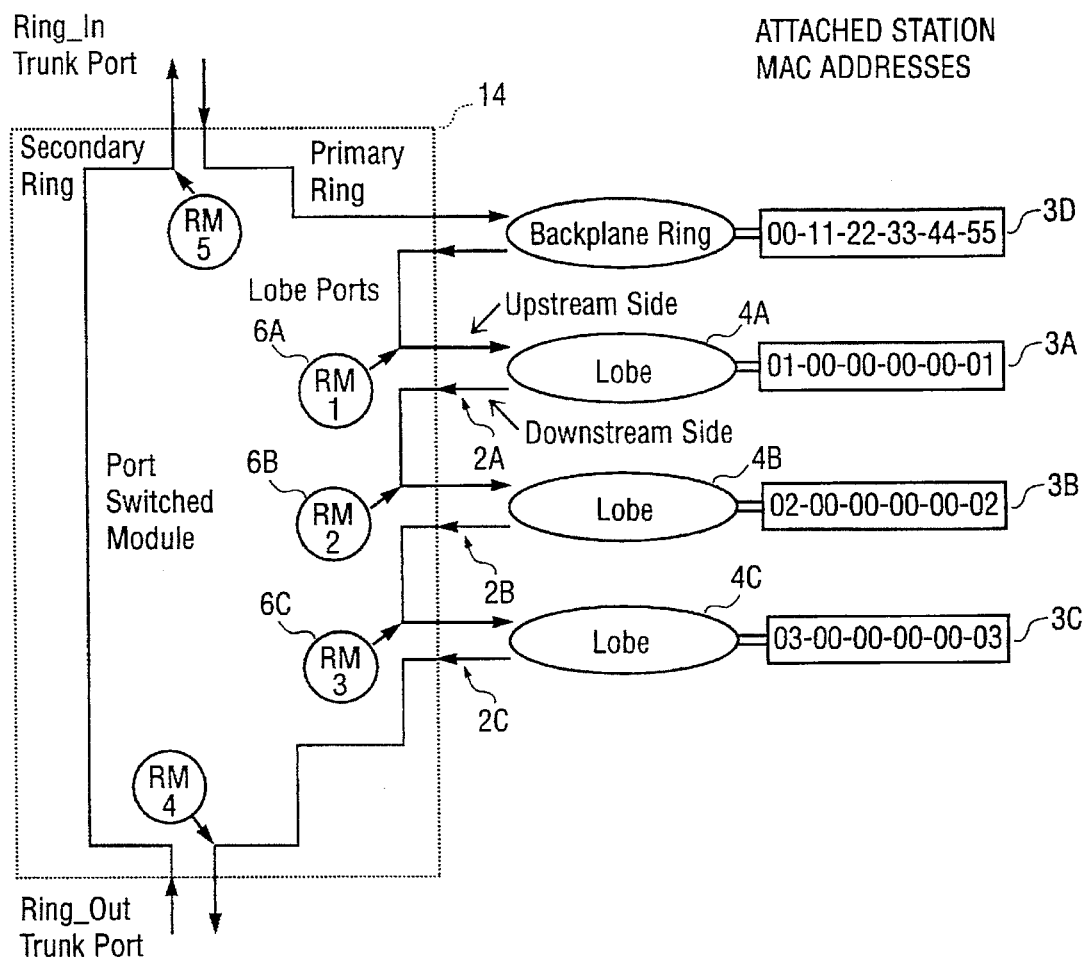
FIG. 3, is a schematic view of a first example of the present invention in a first or initial state with the media module under normal operating conditions.

FIG. 3 shows a typical media module 14 in a Token Ring configuration. Mapping starts with all lobe port Ring Monitors 6 listening to the upstream side of their assigned port 2. The Backplane Ring 5 connects the media module 14 in FIG. 3 to other Token Ring modules in the system.

Figure 5:
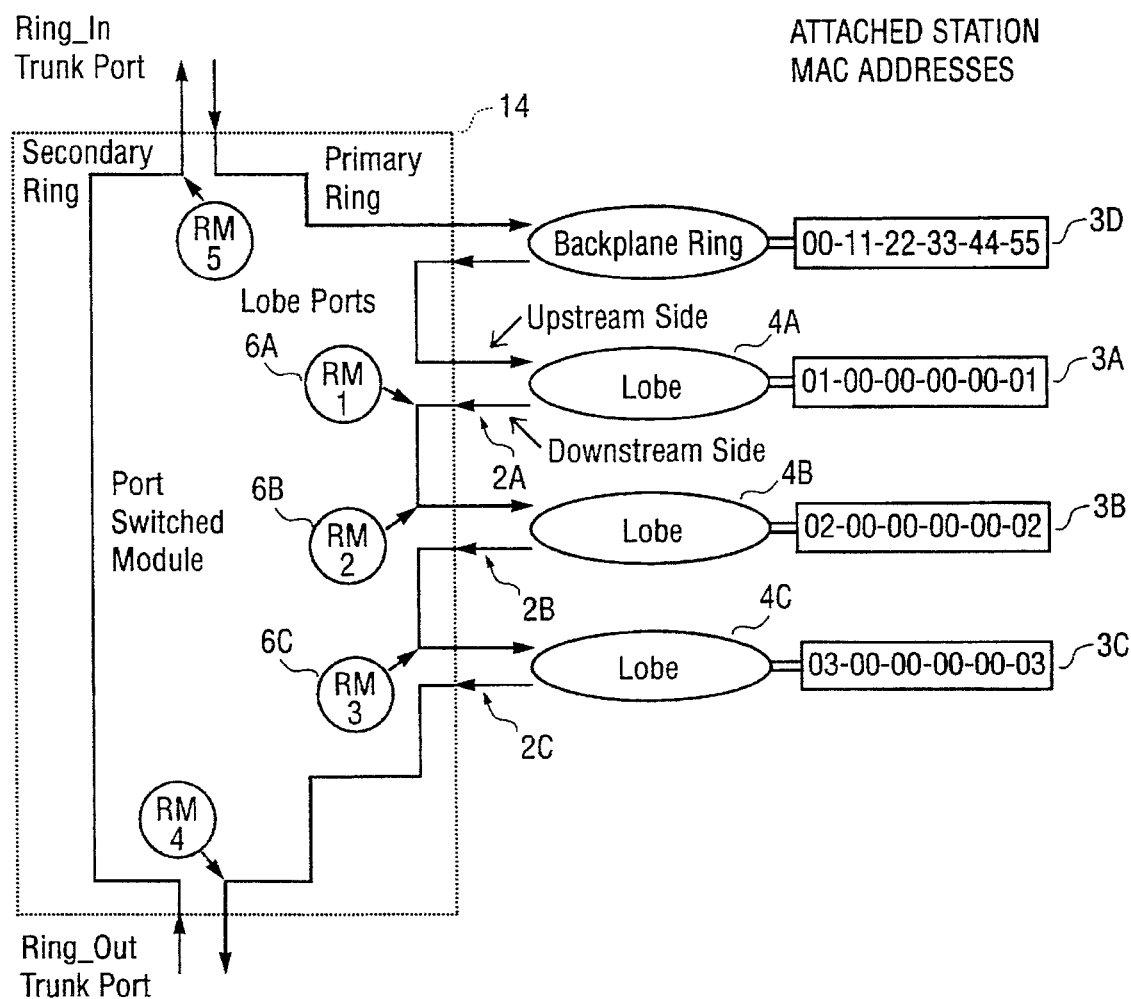
FIG. 5, is a schematic view of the first example in a second state where neighbor notification has been detected on the upstream side of the first lobe and Ring Monitor 1 has been repositioned from the upstream side of the first lobe to the downstream side of the first lobe.

The mapping process is initiated when the Nearest Active Upstream Neighbor, to the module ring segment or the most upstream port of the module which in this example is station 3D with MAC Address "00-11-22-33-44-55", sends a Neighbor Notification frame. The frame is received at Ring Monitor 6A or RM1 with the ARI bits set to zero. Station 3A attached to Lobe 4A and port 2A, sets the ARI bits to one, thus no downstream Ring Monitors 6 or Token ring stations 3 see ARI bits set to zero. As shown in FIG. 4, the Source Address of this frame is stored in the Lobe port 2A entry of Mapping Data Table 1 since it is from the upstream side. The module processor then positions RM1 to the downstream side of port 2A, as shown in FIG. 5.

Figure 6:
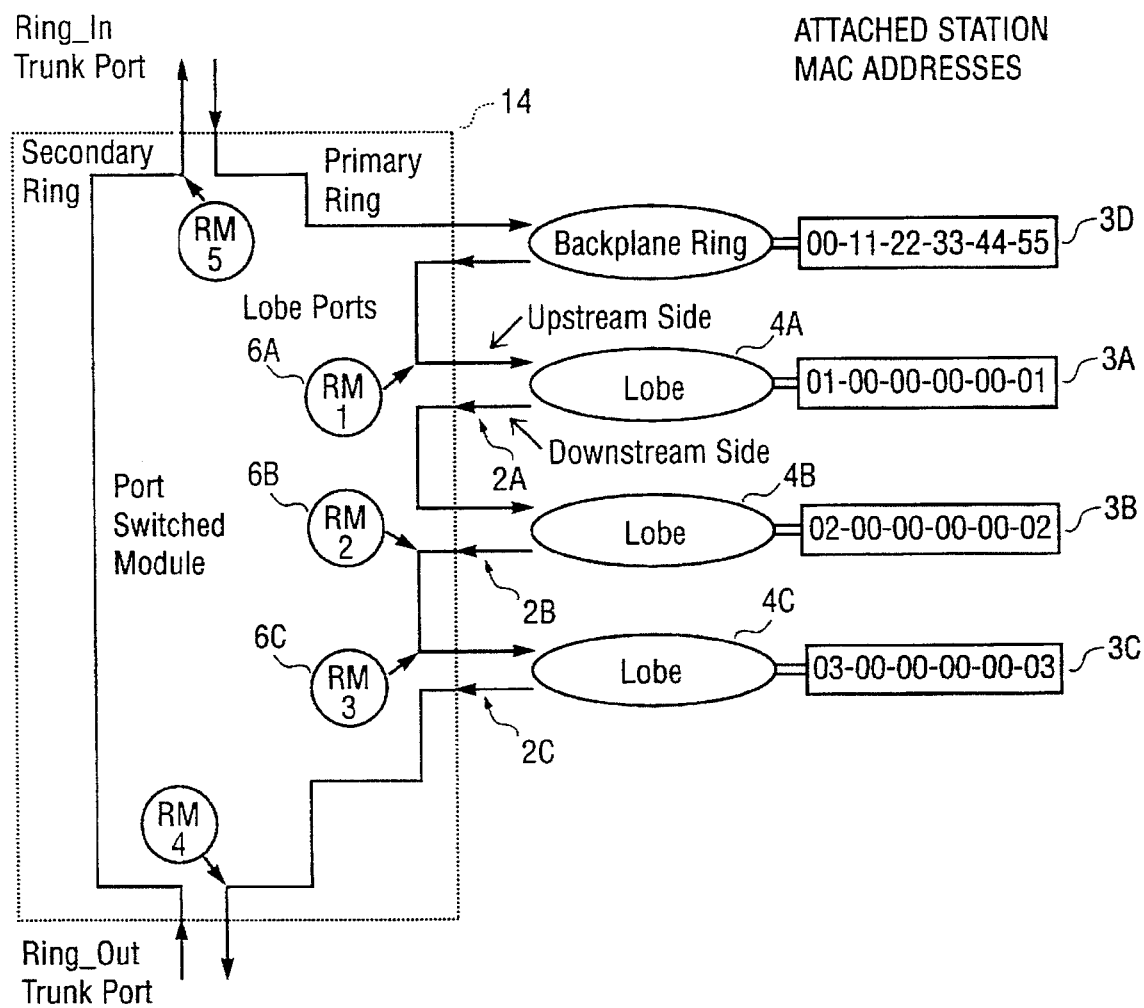
FIG. 6, is the a first example in a third state where neighbor notification has been detected on the upstream side of the second lobe and Ring Monitor 1 has been repositioned from the downstream side of the first lobe to the upstream side of the first lobe, and Ring Monitor 2 has been repositioned from the upstream side of the second lobe to the downstream side of the second lobe.

The next action in the mapping process occurs when the MAC station that is attached to Lobe 4A and port 2A sends a Neighbor Notification frame. This frame is received at Ring Monitors RM1 and RM2 with the ARI bits set to zero. The module processor stores the Source Address of this frame (01-00-00-00-00-01) in the Lobe port 2A entry of Mapping Data Table 2 since it was received on the downstream side of port 2A (FIG. 4). The module processor also inserts the Source Address from this frame in a Lobe port 2B entry of Mapping Data Table 1 (FIG. 4) since it was also received on the upstream side of port 2B. The module processor then positions RM1 to the upstream side of port 2A, and RM2 to the downstream side of port 2B, as shown in FIG. 6.

Figure 7:
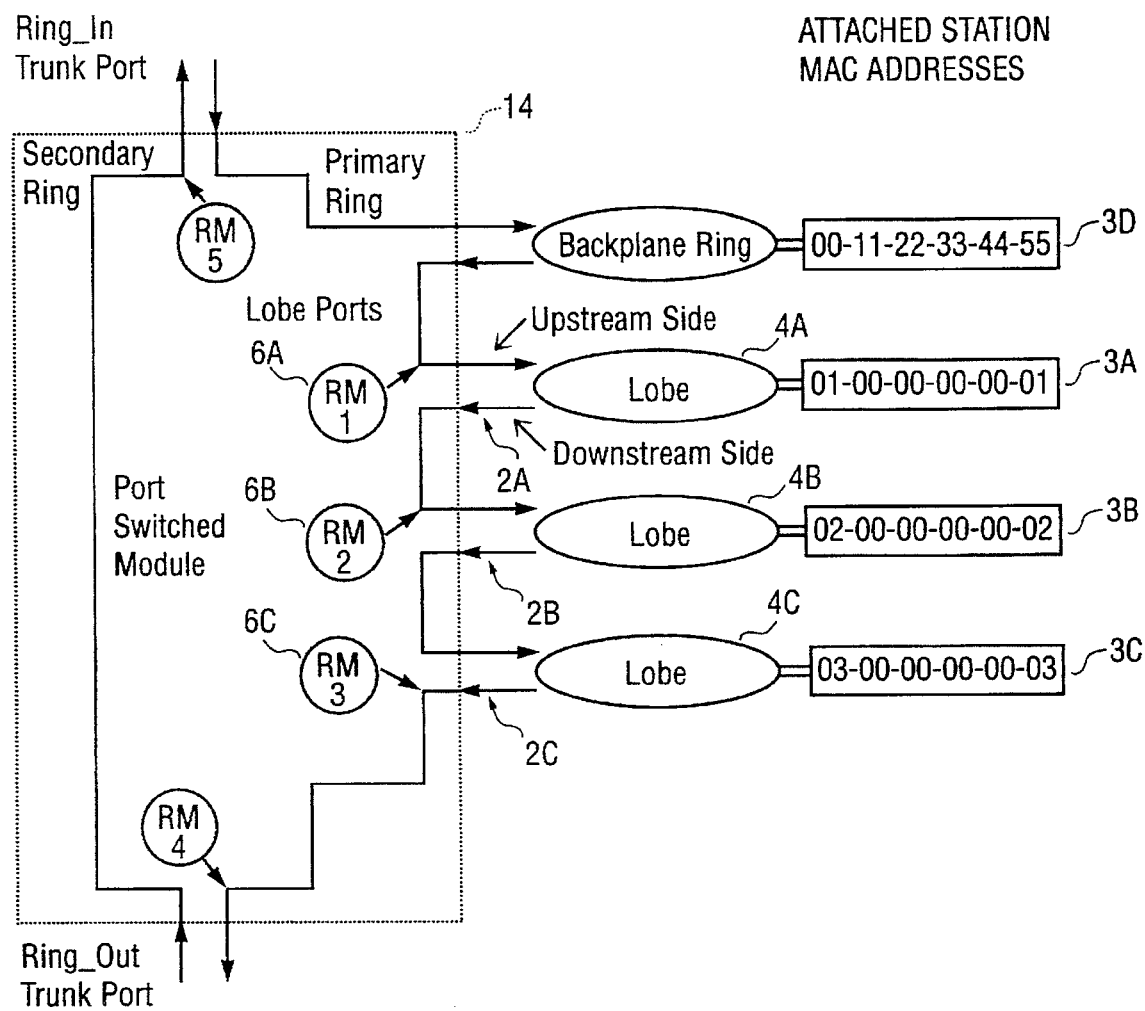
FIG. 7, is the first example in a fourth state where neighbor notification has been detected on the upstream side of the last lobe and Ring Monitor 2 has been repositioned from the downstream side of the second lobe to the upstream side of the second lobe, and Ring Monitor 3 has been repositioned from the upstream side of the last lobe to the downstream side of the last lobe.

The MAC station 3B attached to Lobe 4B then sends a Neighbor Notification Frame. This frame is received at Ring Monitors RM2 and RM3 with the ARI bits set to zero. The module processor stores the Source Address of this frame (02-00-00-00-00-02) in a Lobe port 2B entry of Mapping Data Table 2 since it was received on the downstream side of port 2B (FIG. 4). The module processor stores the Source Address from this frame in a Lobe port 2C entry of Mapping Data Table 1 (FIG. 4) since it was also received on the upstream side of port 2C. The module processor then positions RM2 to the upstream side of Lobe 2B, and RM3 to the downstream side of Lobe 2C (See FIG. 7).

The MAC station 3C attached to Lobe 4C then sends a Neighbor Notification Frame. This frame is received at Ring Monitor RM3 with the ARI bits set to zero. The module processor stores the Source Address of this frame (03-00-00-00-00-03) in a Lobe port 2C entry of Mapping Data Table 2 since it was received on the downstream side of port 2C (FIG. 4). The module processor then positions RM3 to the upstream side of Lobe 3 (See FIG. 3).

The port map in this example is exactly the same as Data Table 2. There is a one-to-one correspondence between stations and ports, and the module processor makes a port map of ports on the respective module by simply copying Data Table 2. The port map for this module can then be forwarded to concentrator management in order for the concentrator to manage the ports on the respective module.

Mapping with a Fanout Box on Lobe Port 1

Figure 8:
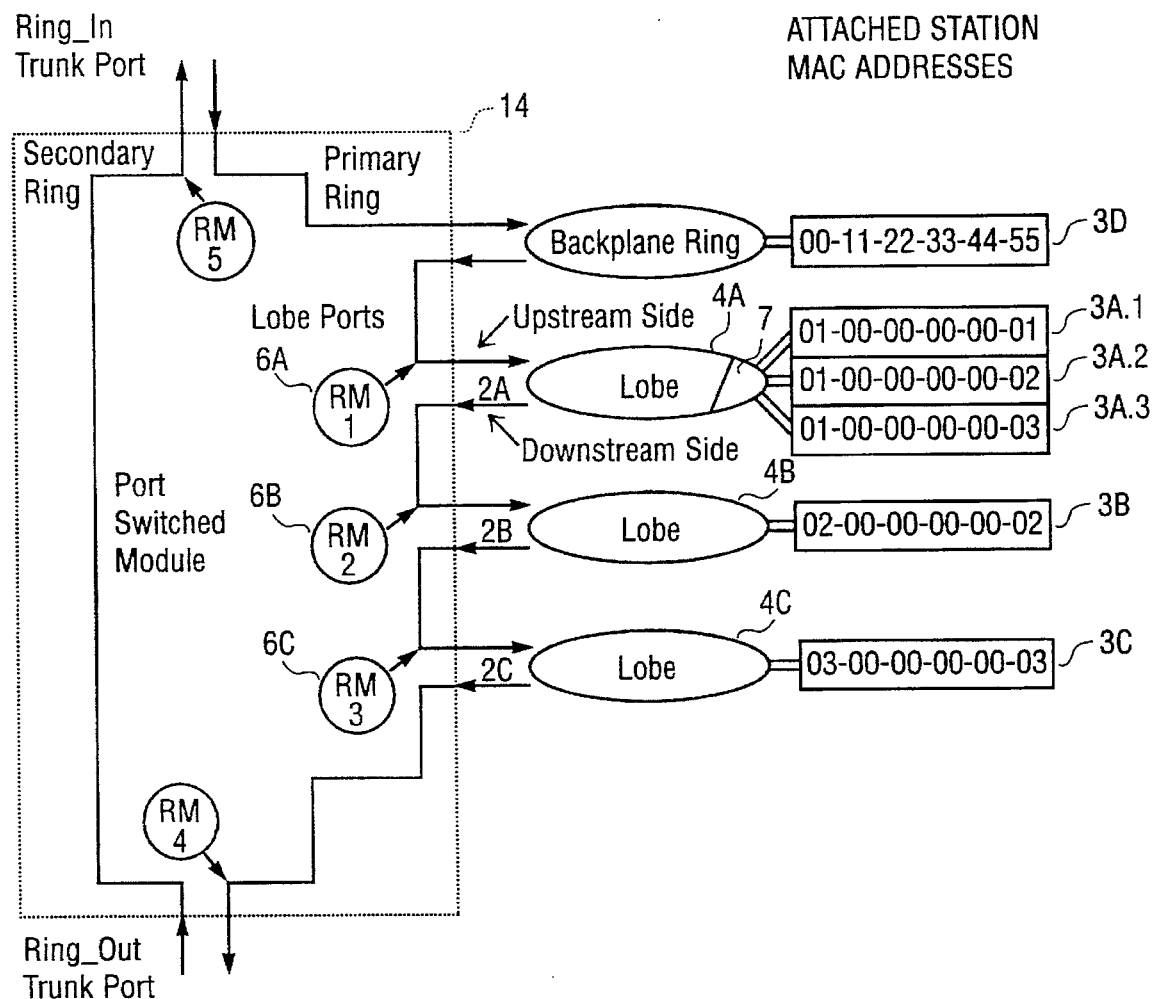
FIG. 8, is a second example of the present invention in a first or initial state of a media module with multiple stations on a single lobe port.

FIG. 8 shows a Token Ring configuration with a fanout box 7 connecting lobe 4A to three different stations 3A.1, 3A.2 and 3A.3. Mapping starts with all port Ring Monitors listening to the upstream side of the respective lobe ports.

Figure 10:
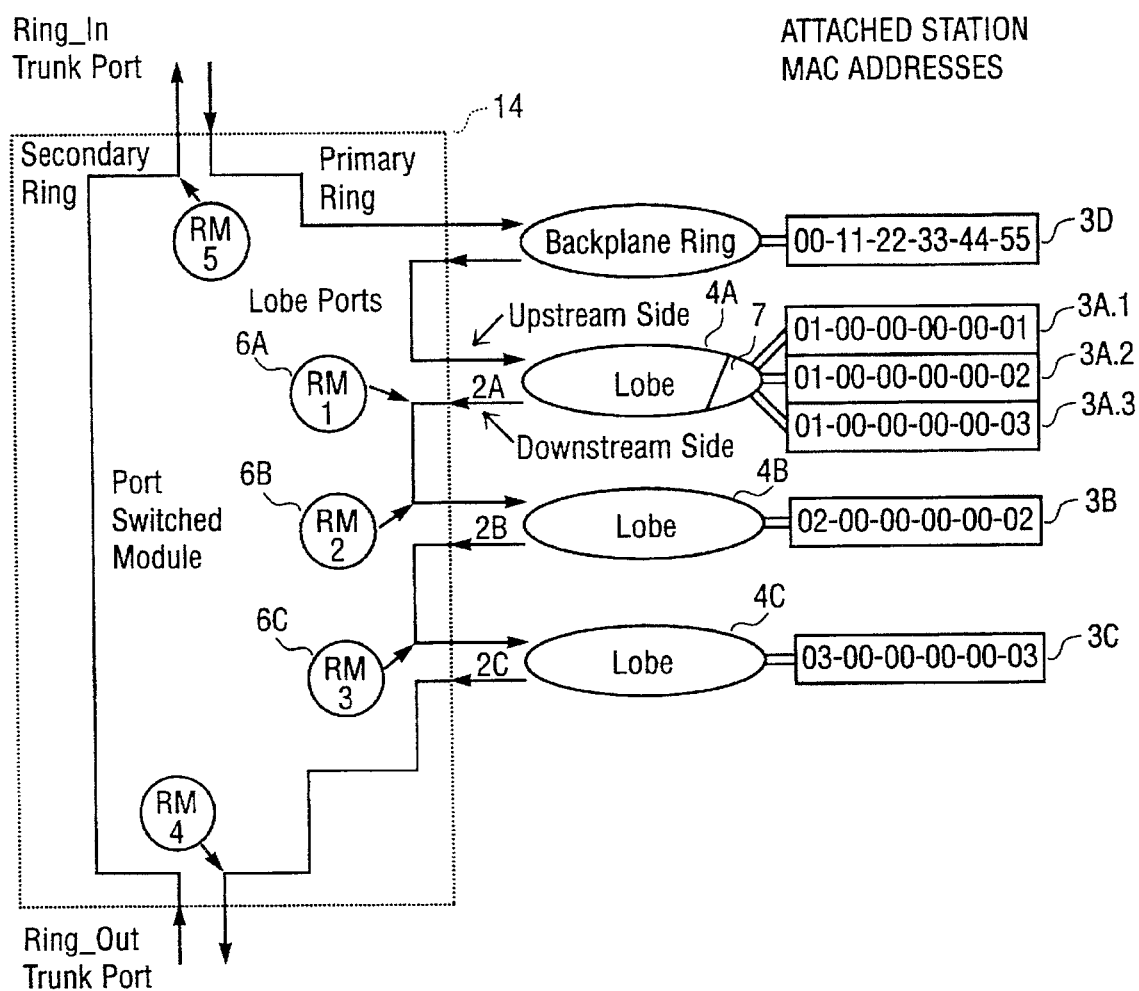
FIG. 10, is the second example in a second state where neighbor notification has been detected on the upstream side of the first lobe and Ring Monitor 1 has been repositioned from the upstream side of the first lobe to the downstream side of the first lobe.

The mapping process is initiated when the Nearest Active Upstream Neighbor, to the module ring segment or the most upstream port of the module which in this example is station 3D with MAC Address "00-11-22-33-44-55", sends a Neighbor Notification frame. The frame is received at Ring Monitor 6A or RM1 with the ARI bits set to zero. Station 3A.1 attached to Lobe 4A and port 2A, sets the ARI bits to one, thus no downstream Ring Monitors 6 or Token ring stations 3 see ARI bits set to zero. As shown in FIG. 9, the Source Address of this frame is stored in the Lobe port 2A entry of Mapping Data Table 1 since it is from the upstream side of port 2A. The module processor then positions RM1 to the downstream side of port 2A, as shown in FIG. 10.

The next action in the mapping process occurs when the first MAC station 3A.1 attached to Lobe 4A sends a Neighbor Notification Frame. The second MAC station 3A.2 attached to Lobe 4A sets the ARI bits to one. This frame is received at Ring Monitor RM1 at the downstream side of the assigned port 2A with the ARI bits set to one. The Source Address of this frame (01-00-00-00-00-01) is stored in a Lobe port 2A entry of Mapping Data Table 2 (FIG. 9). Since the source address was received on the downstream side of port 2A, with the ARI bits set to one, no Ring Monitor positioning action is taken.

The next action in the mapping process occurs when the second MAC station 3A.2 attached to Lobe 4A sends a Neighbor Notification Frame. The third MAC station 3A.3 attached to Lobe 4A sets the ARI bits to one. This frame is received at Ring Monitor RM1 with the ARI bits set to one. No Ring Monitor positioning action is taken. The Source Address of this frame (01-00-00-00-00-02) is also stored in a Lobe 1 entry of Mapping Data Table 2 (FIG. 9) since it was received on the downstream side of port 2A.

Figure 11:
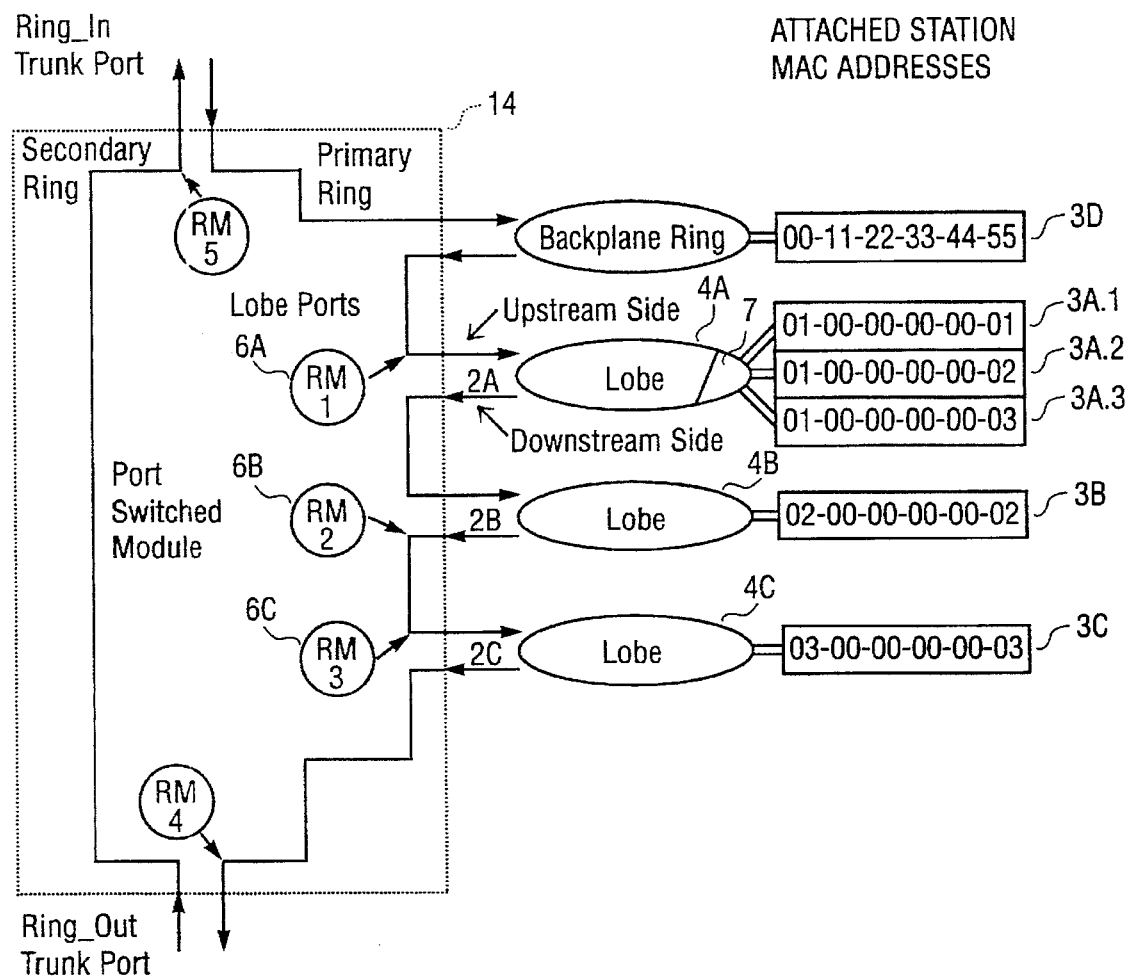
FIG. 11, is the second example in a third state where neighbor notification has been detected on the upstream side of the second lobe and Ring Monitor 1 has been repositioned from the downstream side of the first lobe to the upstream side of the first lobe, and Ring Monitor 2 has been repositioned from the upstream side of the second lobe to the downstream side of the second lobe.

The next action in the mapping process occurs when the third MAC station 3A.3 that is attached to Lobe 4A sends a Neighbor Notification Frame. This frame is received at Ring Monitors RM1 and RM2 with the ARI bits set to zero. The module processor stores the Source Address of this frame (01-00-00-00-00-03) in the Lobe port 2A entry of Mapping Data Table 2 since it was received on the downstream side of port 2A (FIG. 9). The module processor also stores the Source Address from this frame in a Lobe port 2B entry of Mapping Data Table 1 (FIG. 9) since it was also received on the upstream side of port 2B by ring monitor RM2. The module processor then positions RM1 to the upstream side of port 2A, and RM2 to the downstream side of port 2B, as shown in FIG. 11.

Figure 12:
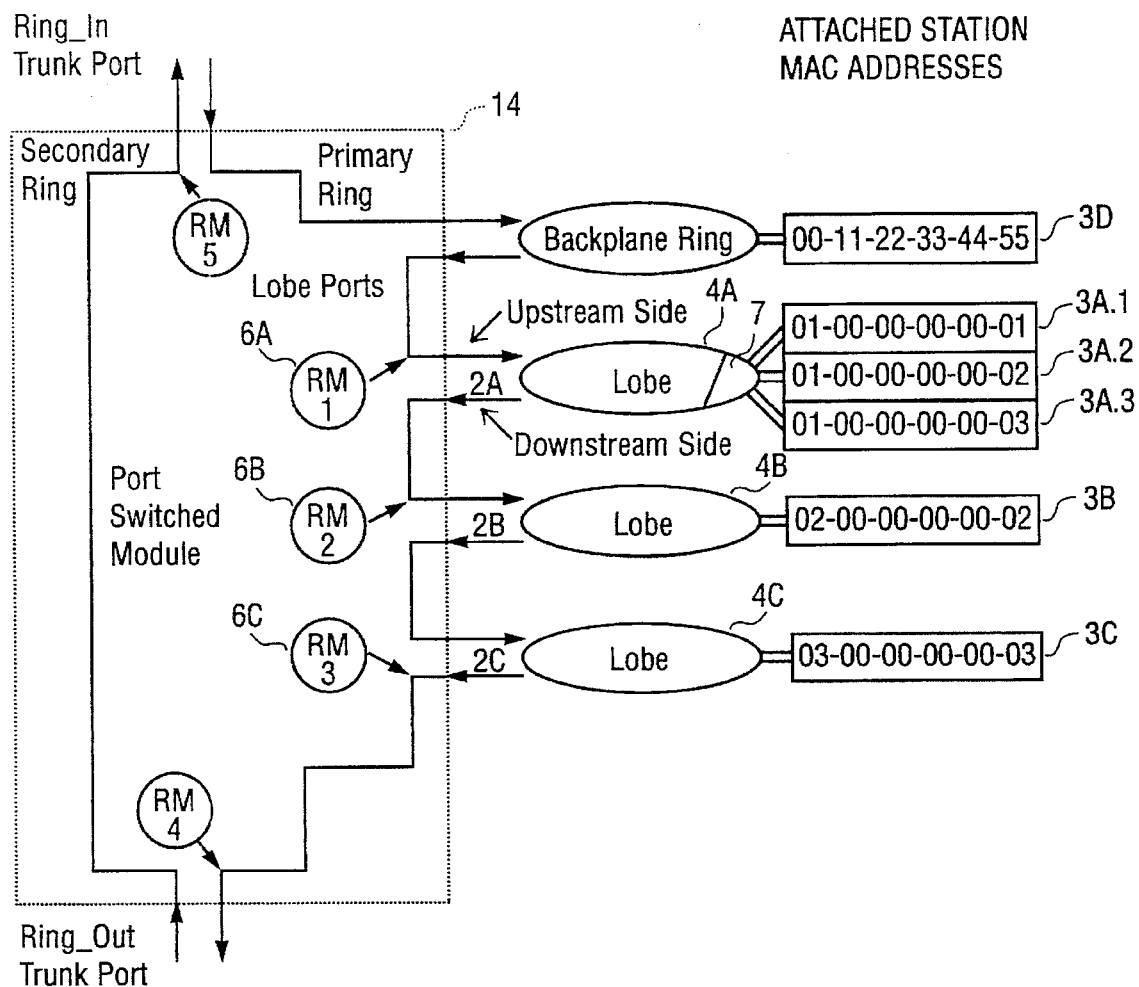
FIG. 12, is the second example in a fourth state where neighbor notification has been detected on the upstream side of the last lobe and Ring Monitor 2 has been repositioned from the downstream side of the second lobe to the upstream side of the second lobe, and Ring Monitor 3 has been repositioned from the upstream side of the last lobe to the downstream side of the last lobe.

The MAC station 3B attached to Lobe 4B then sends a Neighbor Notification Frame. This frame is received at Ring Monitors RM2 and RM3 with the ARI bits set to zero. The module processor stores the Source Address of this frame (02-00-00-00-00-02) in a Lobe port 2B entry of Mapping Data Table 2 (FIG. 9) since it was received on the downstream side of port 2B. The module processor stores the Source Address from this frame in a Lobe port 2C entry of Mapping Data Table 1 (FIG. 9) since it was also received on the upstream side of port 2C by ring monitor RM3. The module processor then positions RM2 to the upstream side of Lobe 2B, and RM3 to the downstream side of Lobe 2C (See FIG. 12).

The MAC station 3C attached to Lobe 4C then sends a Neighbor Notification Frame. This frame is received at Ring Monitor RM3 with the ARI bits set to zero. The module processor stores the Source Address of this frame (03-00-00-00-00-03) in a Lobe port 2C entry of Mapping Data Table 2 (FIG. 9) since it was received on the downstream side of port 2C. The module processor then positions RM3 to the upstream side of Lobe 3 (See FIG. 8).

In this example, the port map can also be copied exactly from the Data Table 2. Lobe 4A, or port 2A has several stations, and Data Table 2 accurately indicates all the stations connected to port 2A. Therefore the port map can be correctly copied from Data Table 2 in this example.

Mapping with a MAC-less Station on Port 2B

Figure 13:
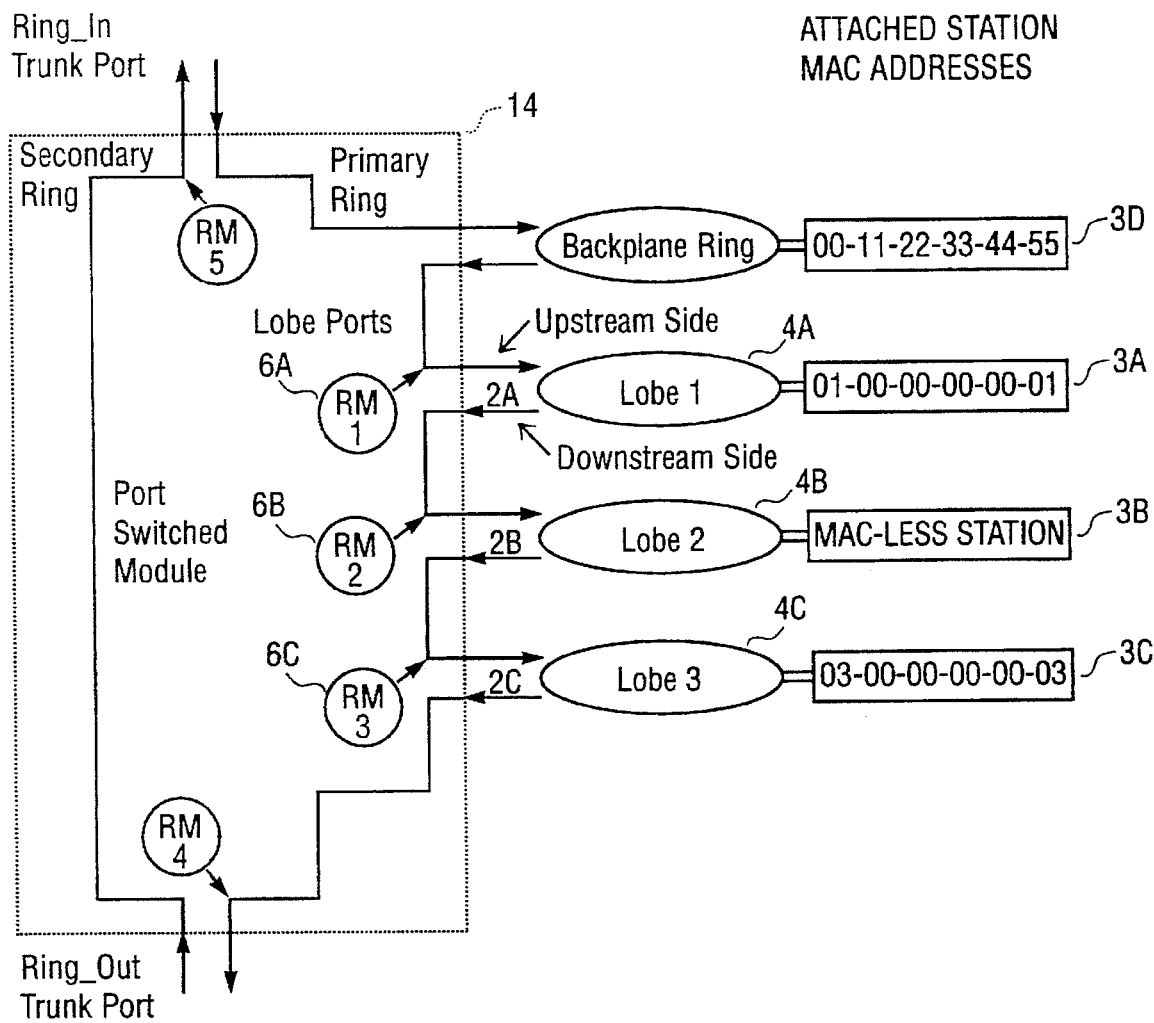
FIG. 13, is a third example of the present invention in a first or initial state of a media module with a MAC-less station on a second lobe port.

FIG. 13 shows a Token Ring configuration with a MAC-Less station attached to Lobe 4B.

Mapping starts with all lobe port Ring Monitors 6 listening to the upstream side of their assigned port 2. The Backplane Ring 5 connects the media module 14 in FIG. 3 to other Token Ring modules in the system.

Figure 15:
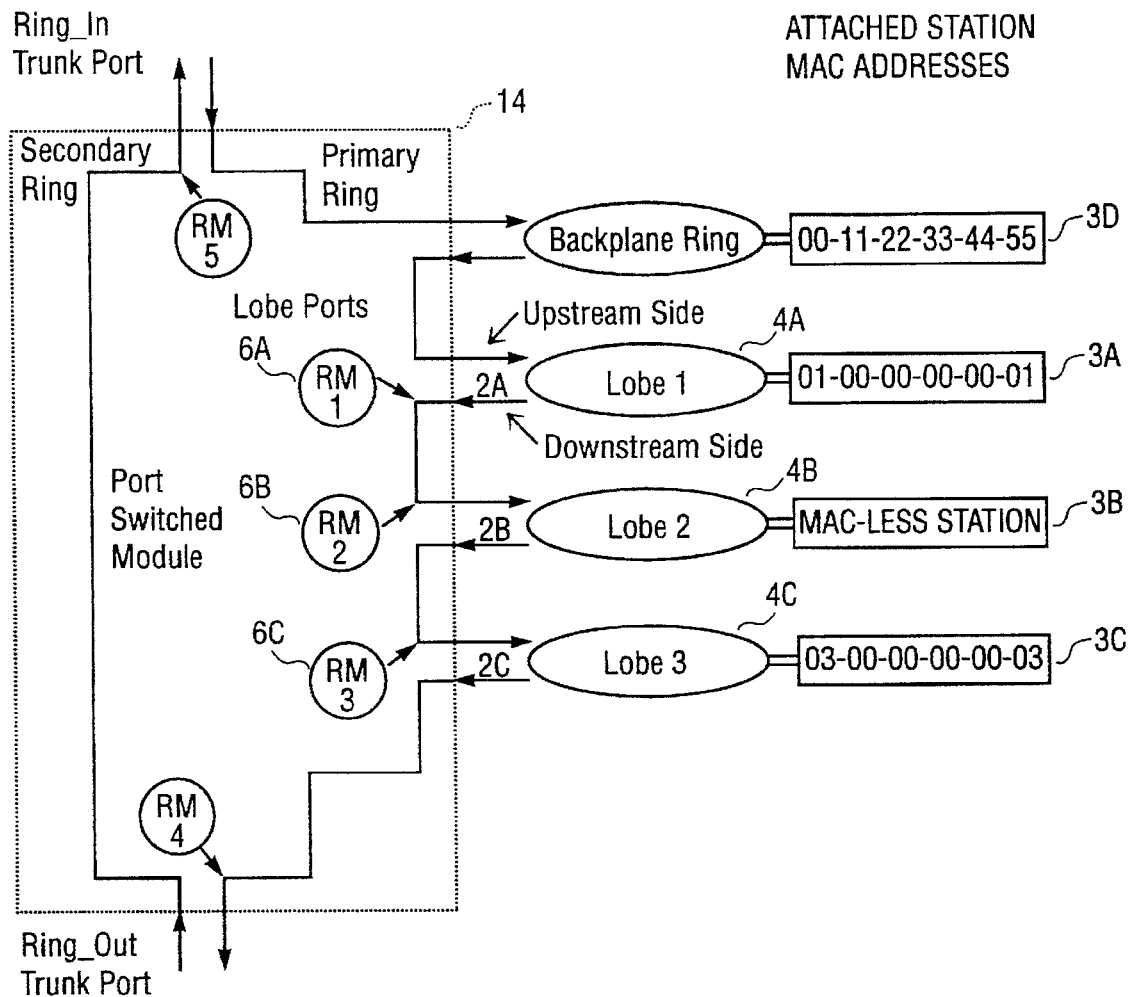
FIG. 15, is the third example in a second state where neighbor notification has been detected on the upstream side of the first lobe and Ring Monitor 1 has been repositioned from the upstream side of the first lobe to the downstream side of the first lobe.

The mapping process is initiated when the Nearest Active Upstream Neighbor, to the module ring segment or the most upstream port of the module which in this example is station 3D with MAC Address "00-11-22-33-44-55", sends a Neighbor Notification frame. The frame is received at Ring Monitor 6A or RM1 with the ARI bits set to zero. Station 3A attached to Lobe 4A and port 2A, sets the ARI bits to one, thus no downstream Ring Monitors 6 or Token ring stations 3 see ARI bits set to zero. As shown in FIG. 14, the Source Address of this frame is stored in the Lobe port 2A entry of Mapping Data Table 1 since it is from the upstream side. The module processor then positions RM1 to the downstream side of port 2A, as shown in FIG. 15.

The next action in the mapping process occurs when the MAC station that is attached to Lobe 4A and port 2A sends a Neighbor Notification Frame. This frame is received at Ring Monitors RM1, RM2 and RM3 with the ARI bits set to zero. The module processor stores the Source Address of this frame (01-00-00-00-00-01) in the Lobe port 2A entry of Mapping Data Table 2 (FIG. 14) since it was received on the downstream side of port 2A. The module processor then positions RM1 to the upstream side of port 2A. Ring monitor RM2 remains at the upstream side of Lobe 2 since the same neighbor notification frame was received by ring monitors RM2 and RM3. Ring monitor RM3 is correspondingly moved to the downstream side of Lobe 4C (See FIG. 16). The module processor stores the Source Address from this frame in a Lobe port 2B entry of Mapping Data Table 1

(FIG. 14) since it was also received on the upstream side of port 2B. The Source Address is also stored in the Lobe port 2B and Lobe port 2C entries of Mapping Data Table 1 since it was received on the upstream side of port 2B and 2C (FIG. 14).

The MAC station 3C attached to Lobe 4C then sends a Neighbor Notification Frame. This frame is received at Ring Monitor RM3 with the ARI bits set to zero. The module processor stores the Source Address of this frame (03-00-00-00-00-03) in a Lobe port 2C entry of Mapping Data Table 2 (FIG. 14) since it was received on the downstream side of port 2C. The module processor then positions RM3 to the upstream side of Lobe 3 (See FIG. 13).

In this example, Data Table 2 can again be copied directly to form a port map. Even though, in this example, port 2B contained a MAC-Less station 3B, the instruction of only moving the most downstream ring monitor, when adjacent ring monitors report identical neighbor notification frames, prevents Data Table 2 from erroneously listing a station connected to port 2B. Therefore the method and apparatus of the present invention can correctly form a port map in Data Table 2 when a MAC-Less station is connected to one of the ports of the module.

Mapping with a MAC-Less Station on the Last Port

Figure 16:
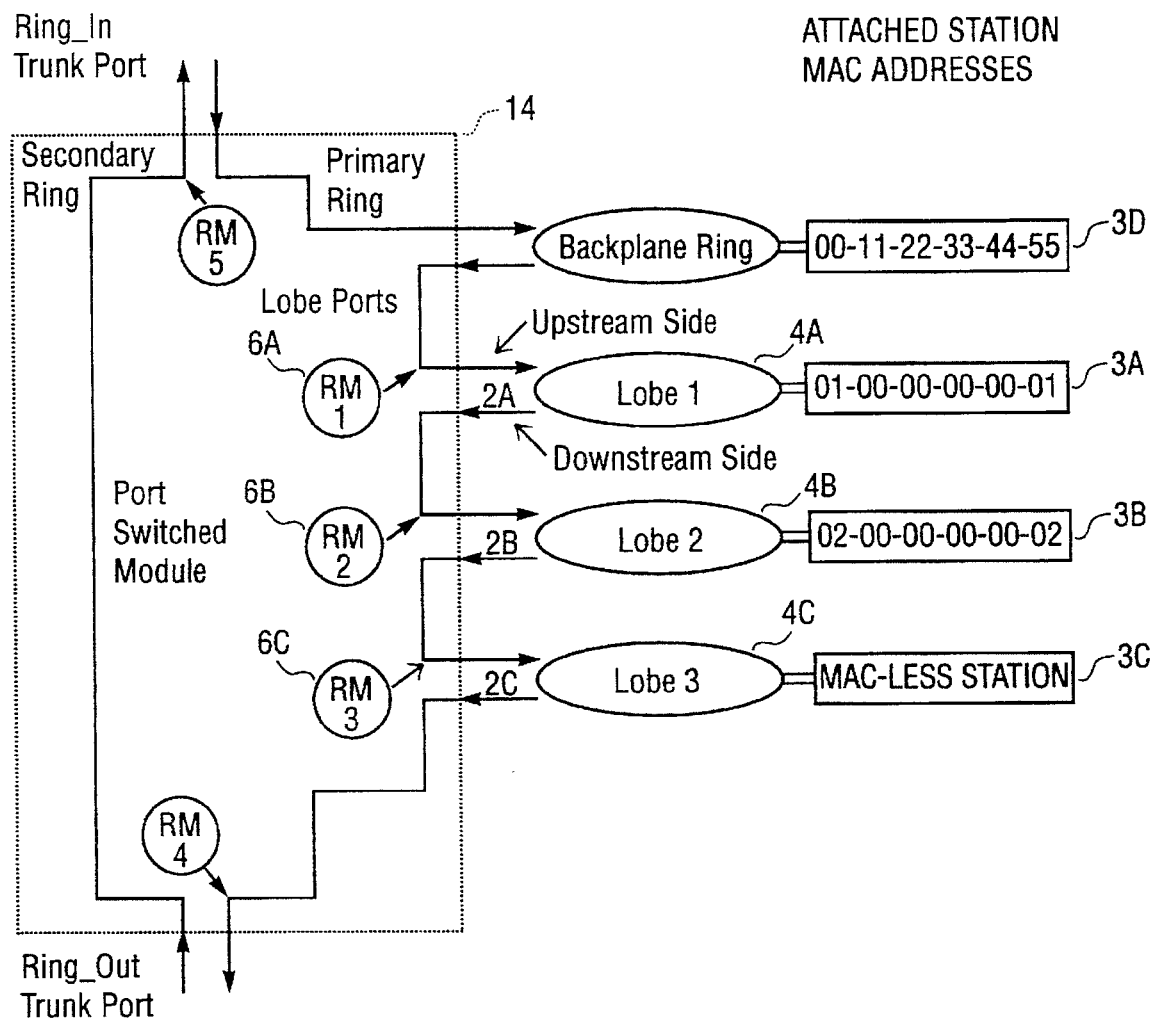
FIG. 16, is a fourth example of the present invention in a first or initial state of a media module with a MAC-less station on a last lobe port.

FIG. 16 shows a Token Ring configuration with a MAC-less Station on the last Lobe port.

Figure 18:
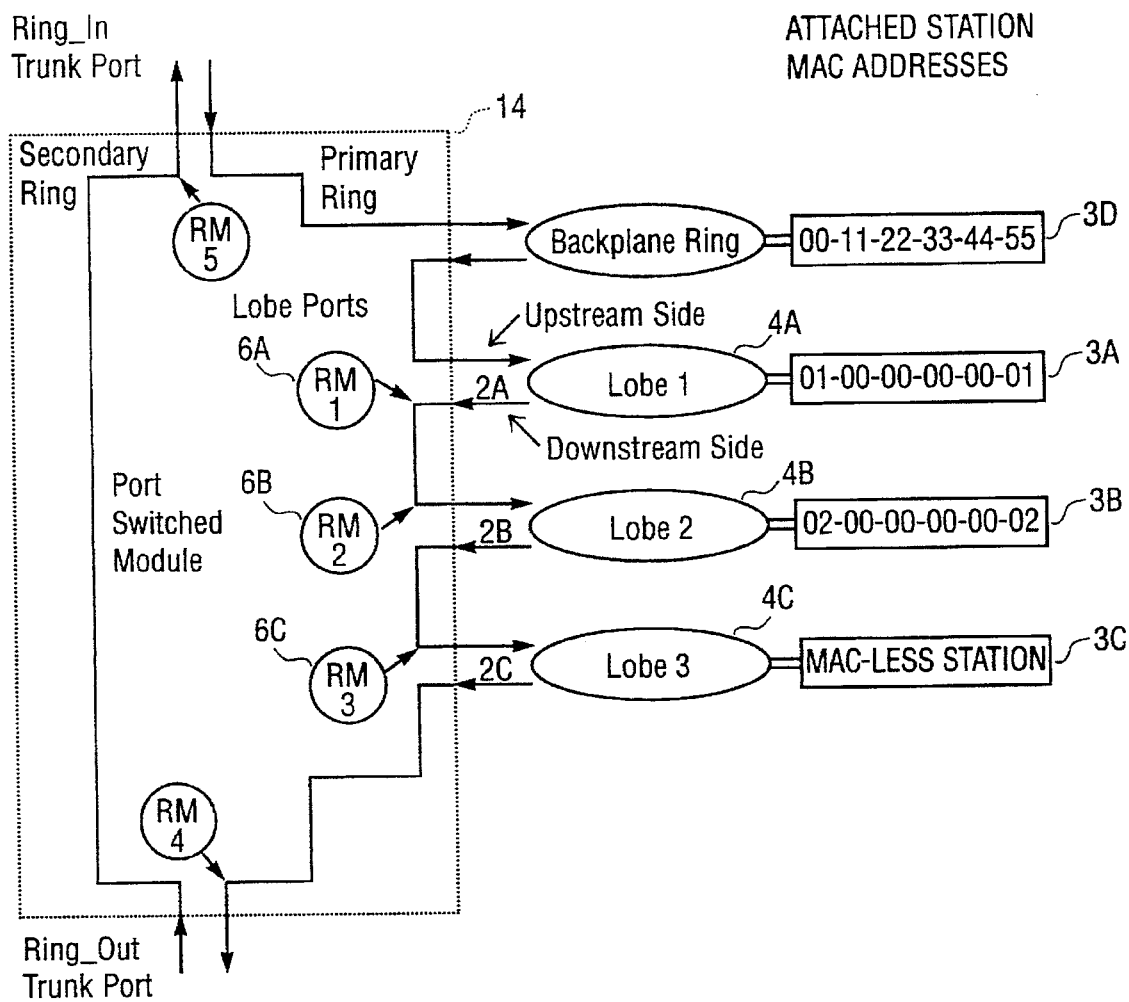
FIG. 18, is the fourth example in a second state where neighbor notification has been detected on the upstream side of the first lobe and Ring Monitor 1 has been repositioned from the upstream side of the first lobe to the downstream side of the first lobe.

Mapping starts with all port Ring Monitors listening to the upstream side of the respective lobe ports. The mapping process is initiated when the Nearest Active Upstream Neighbor, to the module ring segment or the most upstream port of the module which in this example is station 3D with MAC Address "00-11-22-33-44-55", sends a Neighbor Notification frame. The frame is received at Ring Monitor 6A or RM1 with the ARI bits set to zero. Station 3A attached to Lobe 4A and port 2A, sets the ARI bits to one, thus no downstream Ring Monitors 6 or Token ring stations 3 see ARI bits set to zero. As shown in FIG. 17, the Source Address of this frame is stored in the Lobe port 2A entry of Mapping Data Table 1 since it is from the upstream side. The module processor then positions RM1 to the downstream side of port 2A, as shown in FIG. 18.

Figure 19:
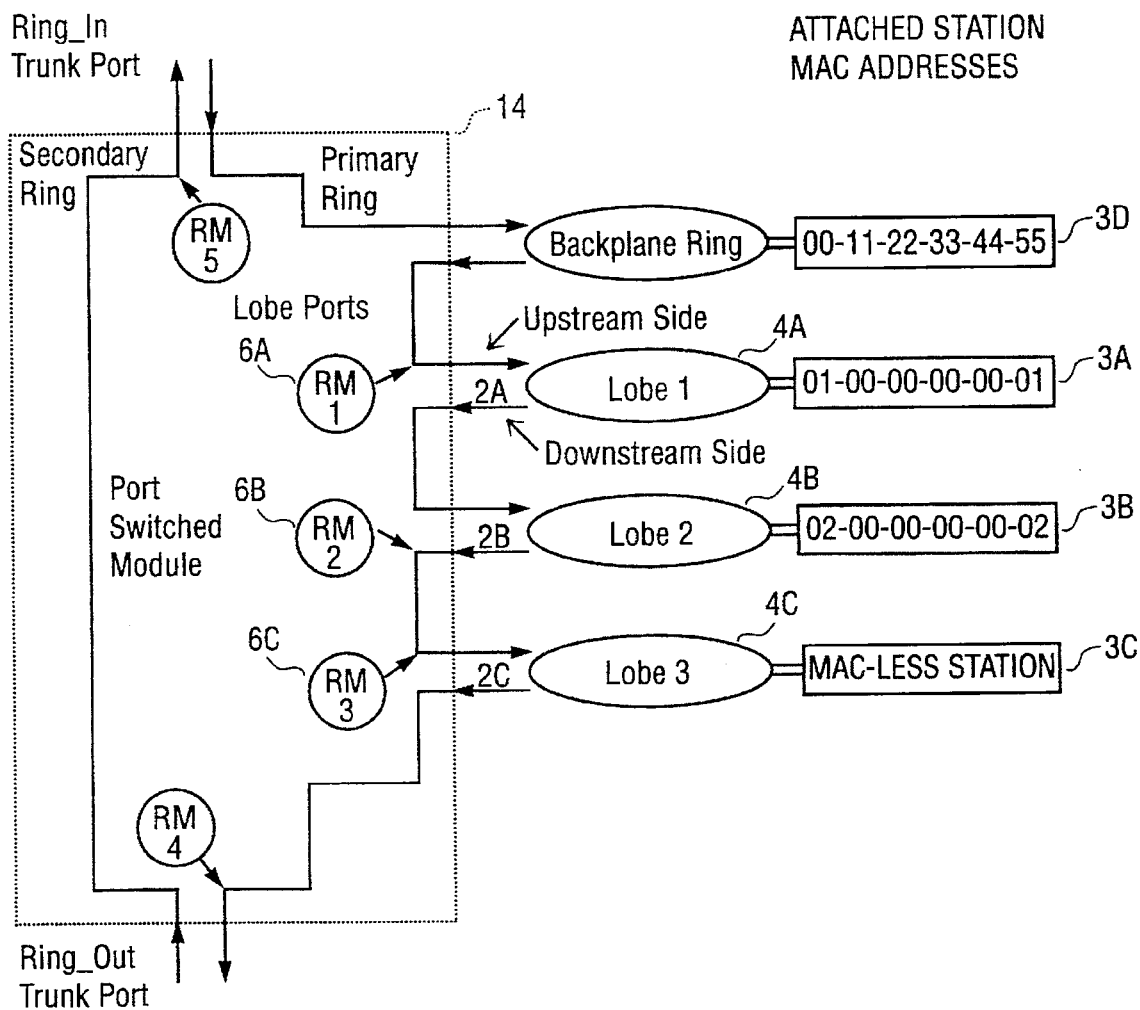
FIG. 19, is the fourth example in a third state where neighbor notification has been detected on the upstream side of the second lobe and Ring Monitor 1 has been repositioned from the downstream side of the first lobe to the upstream side of the first lobe, and Ring Monitor 2 has been repositioned from the upstream side of the second lobe to the downstream side of the second lobe.

The next action in the mapping process occurs when the MAC station that is attached to Lobe 4A and port 2A sends a Neighbor Notification Frame. This frame is received at Ring Monitors RM1 and RM2 with the ARI bits set to zero. The module processor stores the Source Address of this frame (01-00-00-00-00-01) in the Lobe port 2A entry of Mapping Data Table 2 (FIG. 17) since it was received on the downstream side of port 2A. The module processor also stores the Source Address from this frame in a Lobe port 2B entry of Mapping Data Table 1 (FIG. 17) since it was also received on the upstream side of port 2B. The module processor then positions RM1 to the upstream side of port 2A, and RM2 to the downstream side of port 2B, as shown in FIG. 19.

Figure 20:
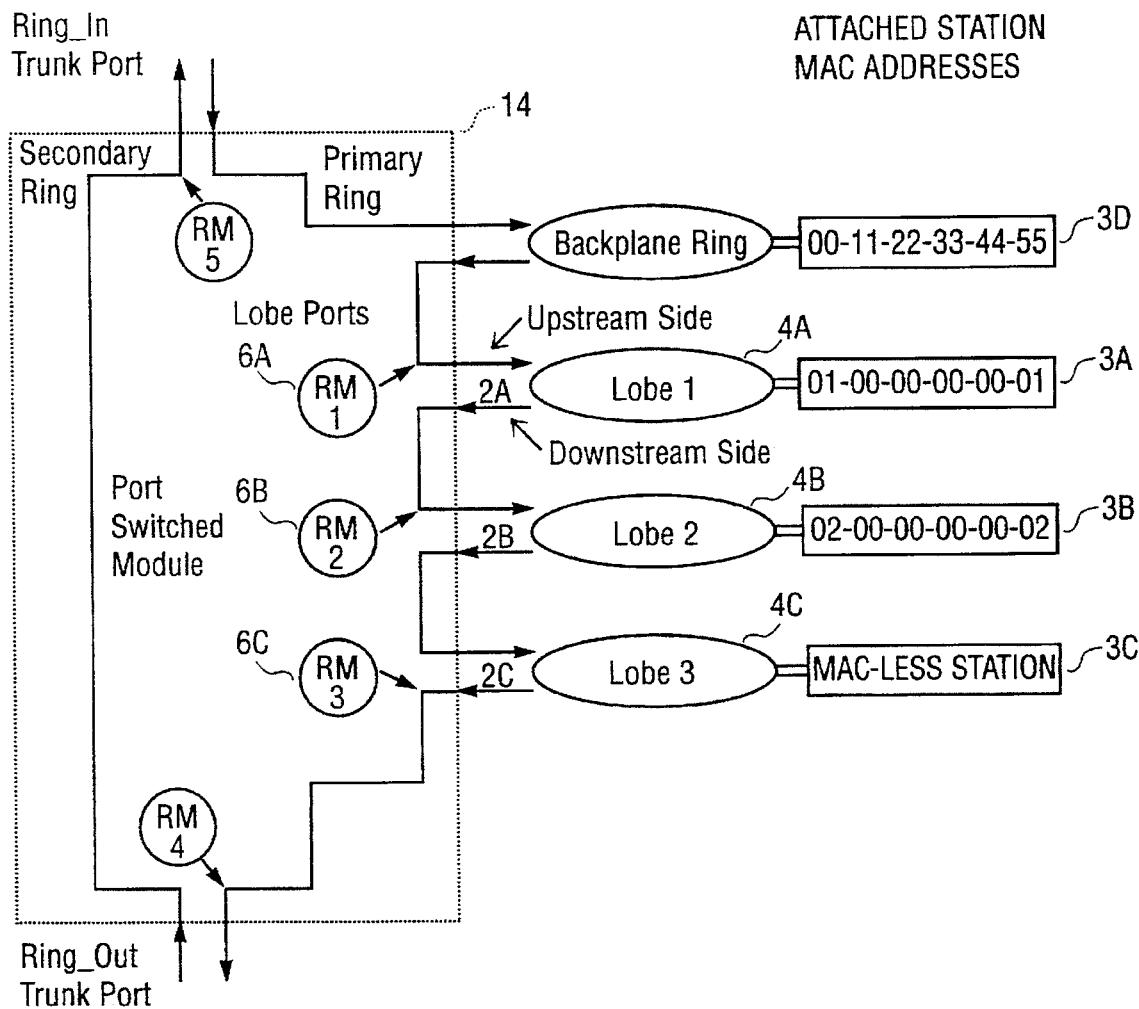
FIG. 20, is the fourth example in a fourth state where neighbor notification has been detected on the upstream side of the last lobe and Ring Monitor 2 has been repositioned from the downstream side of the second lobe to the upstream side of the second lobe, and Ring Monitor 3 has been repositioned from the upstream side of the last lobe to the downstream side of the last lobe.

The MAC station 3B attached to Lobe 4B then sends a Neighbor Notification Frame. This frame is received at Ring Monitors RM2 and RM3 with the ARI bits set to zero. The module processor stores the Source Address of this frame (02-00-00-00-00-02) in a Lobe port 2B entry of Mapping Data Table 2 (FIG. 17) since it was received on the downstream side of port 2B. The module processor also stores the Source Address from this frame in a Lobe port 2C entry of Mapping Data Table 1 (FIG. 17) since it was also received on the upstream side of port 2C with the ARI bits set to zero. The module processor then positions RM2 to the upstream side of Lobe 2B, and RM3 to the downstream side of Lobe 2C (See FIG. 20).

No MAC stations are attached to Lobe 3, but all MAC stations on the ring up to and including the station that is the Nearest Active Upstream Neighbor to Lobe 4A (00-11-22-33-44-55) will be stored to Mapping Data Table 2, since the neighbor notification process continues around the entire ring and each station sends its own neighbor notification frame around the entire ring. When the Nearest Active Upstream Neighbor to Lobe 4A sends a Neighbor Notification Frame, it is received at Ring Monitors RM1 with the ARI bits set to zero. The module processor positions RM1 to the downstream side of Lobe 1, and RM3 to the upstream side of Lobe 3 (See FIG. 18). Since the last Lobe port 2C entry in Data Table 2 matches that of the Lobe port 2A entry in Data Table 1, the port map for Lobe port 2C will contain no entries.

The entry for Lobe port 2C in data Table 2 will therefore continue to fill-up since the MAC-Less station on Lobe 4C will not generate a neighbor notification frame with the ARI bits set to zero. The Lobe port 2C entry will continue to fill-up, until port 2A receives a frame with the ARI bits set to zero. Then when making the port map, the module processor checks to see if the last entry in the Lobe ports of Data Table 2 has the ARI bits set to one and if the source address matches that of the entry in Lobe port 2A of Data Table 1. If so, the stations entered into Data Table 2 for Lobe port 2C are not included the port map.

While specific embodiments of the invention have been shown and described in detail to illustrate the application of the principles of the invention, it will be understood that the invention may be embodied otherwise without departing from such principles.

What is claimed is:

1. A method for address to port mapping in a ring network, the method comprising the steps of:
   performing neighbor notification where each station on the network sequentially transmits its own neighbor notification frame onto the ring indicating an address of a respective station, a receiving station modifying a received neighbor notification frame if said receiving station is a first station to receive said neighbor notification frame;
   upstream monitoring of an upstream side of a port on the network to determine when an immediately upstream station transmits its neighbor notification frame onto the ring;
   downstream monitoring of a downstream side of said port and recording all addresses in frames after said immediately upstream station transmits its neighbor notification frame onto the ring until said downstream monitoring determines an address of a station immediately upstream of said downstream side;
   mapping all of said addresses recorded and determined from said downstream side to said port.

2. A method in accordance with claim 1, wherein:
   the ring includes a plurality of ports, said upstream and downstream monitoring is performed on each of the plurality of ports.

3. A method in accordance with claim 2, wherein:
   the plurality of ports are divided into a plurality of groups, each of said groups independently controls said monitoring of said upstream side and said downstream side of ports in a respective group;

each group creating an address to port mapping for ports in said group.

4. A method in accordance with claim 2, wherein:

a group of said ports are part of a media module positioned in a concentrator, and a module processor of said media module controls said monitoring of said upstream side and said downstream side of ports in said group;

said media module creating an address to port mapping for ports in said media module.

5. A method in accordance with claim 4, wherein:

said media module includes a plurality of ring monitors, each of said plurality of ring monitors being associated to one of said ports, said module processor connecting said each ring monitor to said upstream side for said monitoring of said upstream side of a respective port, said module processor connecting said each ring monitor to said downstream side for said monitoring of said downstream side of a respective port.

6. A method in accordance with claim 4, wherein:

another group of said ports are part of another media module positioned in said concentrator, and a module processor of said another media module independently controls said monitoring of said upstream side and said downstream side of ports in said another group;

said another media module creating an address to port mapping for ports in said another media module;

combining address to port mapping from said media module and said another media module to form a concentrator address to port mapping;

using said concentrator address to port mapping for management of the ring network.

7. A method in accordance with claim 1, wherein:

the ring network is a token ring network and conforms to IEEE 802.5 communication standard protocol.

8. A method in accordance with claim 2, further comprising:

monitoring upstream sides of adjacent ports for neighbor notification frames indicating a same immediately upstream station;

performing said downstream monitoring only for a most downstream of said adjacent ports indicating a same immediately upstream station.

9. A method in accordance with claim 3, further comprising:

capturing a source address at said upstream side of a most upstream port of one of said plurality of groups from said neighbor notification frame of said immediately upstream station;

indicating a non-protocol station connected to one port of said one group if one of said addresses recorded and determined from said downstream side of said one port matches said source address;

rejecting all of said addresses recorded and determined from a port connected to a non-protocol station from said mapping.

10. A method in accordance with claim 3, further comprising:

creating a first and second data table of the ports for each of said groups;

at said upstream side of said each port, capturing a source address from said neighbor notification frame of said immediately upstream station;

placing said source addresses taken from said upstream side in a corresponding first data table;

placing all of said addresses recorded and determined from said downstream side to a corresponding second data table;

indicating an inactive port if ARI bits and a last address in said second data table is similar to a first address in a corresponding first data table;

forming an address-to-port map from all addresses in said second data table not associated with inactive ports.

11. A ring network system for address to port mapping the system comprising:

a plurality of ports formed into a ring;

a plurality of stations connected to said plurality of ports;

neighbor notification means positioned in each of said plurality of stations and for performing neighbor notification where said neighbor notification means sequentially transmits its own neighbor notification frame onto the ring indicating an address of a respective station, a receiving station modifying a received neighbor notification frame if said receiving station is a first station to receive said neighbor notification frame;

a plurality of upstream monitoring means, each upstream monitoring means for monitoring of an upstream side of one of said plurality of ports on the network to determine when an immediately upstream station transmits its neighbor notification frame onto the ring;

a plurality of downstream monitoring means, each downstream monitoring means for monitoring of a downstream side of one said plurality of ports, said downstream monitoring means recording all addresses in frames after said immediately upstream station transmits its neighbor notification frame onto the ring and until said downstream monitoring determines an address of a station immediately upstream of said downstream side;

mapping means for mapping all of said addresses recorded and determined from said each downstream monitoring means to a respective port.

12. A system in accordance with claim 11, further comprising:

a plurality of ring monitors, each of said plurality of ring monitors being assigned to one of said ports, said each ring monitor including said upstream monitor means and said downstream monitor means for said assigned port, said each ring monitor including a single reading means switchable between said upstream side and said downstream side of said port.

13. A system in accordance with claim 11, further comprising:

a media module including a group of said ports, said media module including a module processor means for controlling said upstream and downstream monitor means of said group of said ports, said module processor means creating an address to port mapping for said ports in said media module;

another media module including another group of said ports, said another media module including a module processor means for controlling said upstream and downstream monitor means of said another group of said ports, said module processor means creating an address to port mapping for said ports in said another media module;

concentrator means for connecting said media module and said another media module into a ring network, said concentrator means combining address to port mapping from said media module and said another media module to form a concentrator address to port map and using said concentrator address to port mapping for management of the ring network.

14. A system in accordance with claim 13, wherein:

said media module and said another media module include a plurality of ring monitors, each of said plurality of ring monitors being assigned to one of said ports, said each ring monitor including said upstream monitor means and said downstream monitor means for said assigned port, said each ring monitor including a single reading means switchable between said upstream side and said downstream side of said port;

said module processor means initially positions said ring monitors on said upstream side of said assigned port;

said module processor means moves said ring monitors from said upstream side to said downstream side of said assigned port after said immediately upstream station transmits its neighbor notification frame onto the ring;

said module processor means moves said ring monitors from said downstream side to said upstream side of said assigned port after said address of said station immediately upstream of said downstream side transmits its neighbor notification frame onto the ring.

15. A system in accordance with claim 14, wherein:

said module processor means monitors upstream sides of adjacent ports for neighbor notification frames indicating a same immediately upstream station, said module processor means only moving a most downstream ring monitor of said adjacent ports indicating a same immediately upstream station.

16. A system in accordance with claim 14, wherein:

said module processor means moves all ring monitors positioned downstream of a most upstream ring monitor to said upstream side when said most upstream ring monitor receives said neighbor notification frame from said immediately upstream station on said upstream end of said assigned port.

17. A system in accordance with claim 14, wherein:

said module processor means captures a source address of an immediately upstream station at said upstream side of a most upstream port;

said module processor means indicating a non-protocol station connected to one port of a respective module if one of said addresses of a last entry with ARI bits not set to zero which is recorded and determined from said downstream monitoring means matches said source address;

said mapping means ignoring all of said addresses recorded and determined from a port connected to a non-protocol station from said mapping.

18. A system in accordance with claim 14, wherein:

said media module creates a first and second data table of the ports for each respective module;

said media module captures a source address from said neighbor notification frame of said immediately upstream station at said upstream side of each of said ports on a respective media module;

said media module places said source addresses taken from said upstream side in a corresponding first data table;

said media module places all of said addresses recorded and determined from said downstream side to a corresponding second data table;

said media module indicates an inactive port if an address in said second data table is similar to a first address in a corresponding first data table;

said mapping means forming an address-to-port map from all addresses in said second data table not associated with inactive ports.

19. A system in accordance with claim 11, wherein:

the ring is a token ring network and conforms to IEEE 802.5 communication standard protocol.

* * * * *